(No Model.)
A. HASKINS.
SASH HOLDER.
No. 324,252. Patented Aug. 11, 1885.
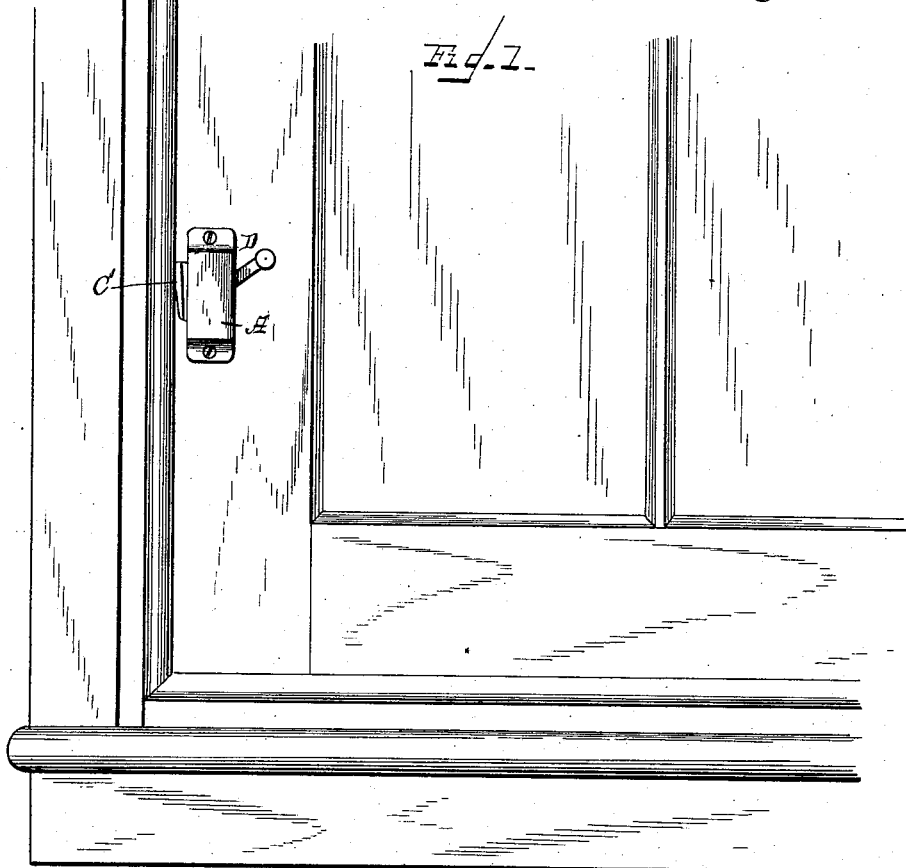
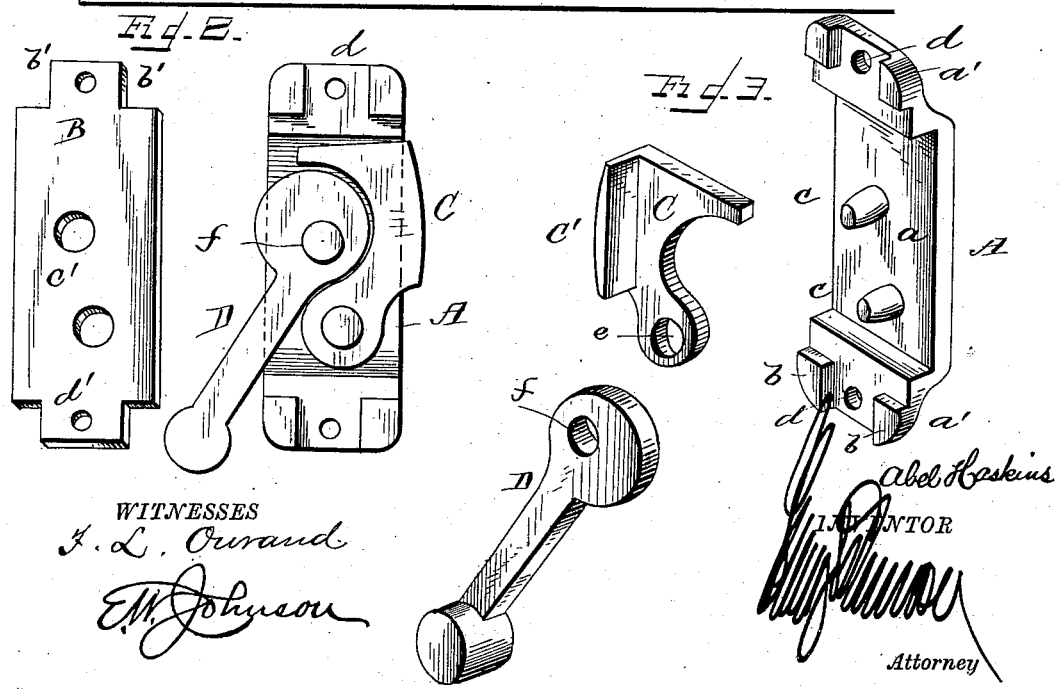

UNITED STATES PATENT OFFICE.

ABEL HASKINS, OF CHICOPEE, MASSACHUSETTS.

SASH-HOLDER.

SPECIFICATION forming part of Letters Patent No. 324,252, dated August 11, 1885.

Application filed April 23, 1885. (No model.)

*To all whom it may concern:*

Be it known that I, ABEL HASKINS, a citizen of the United States of America, residing at Chicopee, in the county of Hampden and State of Massachusetts, have invented certain new and useful Improvements in Sash-Holders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in sash-holders; and it consists in the construction and combination of the parts, as will be hereinafter fully set forth, and specifically pointed out in the claim, the object of my invention being to provide a sash-holder which will consist of but few parts, the pivots upon which the movable parts turn being constructed integral with the covering-plate, which covering-plate is also recessed for the reception of a backing-plate, whereby said backing-plate is held in position and against the window-frame by the screws which secure the sash-holder to the window-frame.

In the accompanying drawings, which illustrate my invention, Figure 1 is a view showing my improved sash-holder attached to a window. Fig. 2 is a plan view showing the covering-plate removed. Fig. 3 is a perspective view showing the parts detached from each other.

A represents the outer covering plate or casing, which is centrally provided with a recess, $a$, and end portions, $a'$, which end portions are cut away, so as to provide projecting shoulders $b$, the inner edges of which are at right angles with each other. In the recess $a$, integral with the outer casing, are upwardly-projecting pins $c\ c$, which are of such a height that their points will be on a line with the faces of the raised corner pieces. Between the corner pieces, $b\ b$, are perforations $d\ d$, through which pass screws, which serve to hold the parts together, and also attach the sash-holder to a window-frame.

B represents the inner covering-plate, the ends of which are cut away, as shown at $b'$, so that the same will lie between the raised corner pieces of the outer casing, A, and this plate is provided with perforations $d'$ and $c'$, which will register with the perforations $d$ and the pins $c$ when the plate is placed in position.

C represents a dog, which is provided at its lower portion with a perforation, $e$, which is placed over the lower pin $c$ of the outer casing. The outer face of this dog, which extends beyond the casing A, is provided with a portion, $C'$, which projects at right angles therewith, and is curved and serrated on its outer face, which comes in contact with the sash-frame, and opposite this angular portion the dog C is curved, as shown, which curved portion comes in contact with a cam which is formed on the end of a lever, D. The cam on the end of this lever D is provided with a perforation, $f$, which passes over the upper pin, which is formed integral with the outer casing.

It will be readily seen that when the lever is raised the dog C will be forced outwardly, and that when being forced outwardly the curved portion of the dog will always be in contact with the cam, thus obviating excessive wear upon any particular part. The end of the lever D is weighted or enlarged, which provides a convenient finger-piece as well as weighting the end of the lever, so that it may be held in position by gravity. The dog being pivoted to the lower portion of the casing will prevent the window from being raised from without even when the cam is depressed, as it will fall outward, so as to press against the edge of the window-frame.

It will be readily seen that by the construction hereinbefore described I provide a sash-holder which is cheap and effective in construction, the parts of which are held together by the same means which are employed to attach the casing to the window-frame.

I claim—

The improved sash-holder herein described, consisting of a casing or covering plate, A, having a central recess with projecting pins $c\ c$, raised corner pieces, $b$, between which are located perforations $d\ d$, the rear covering-plate, B, having the corners thereof cut away, between which cut-away portions are located perforations $d'$ and openings $c'$, into which the ends of the pins $c$ project, a dog having an angular projecting portion, $C'$, the inner edge of said dog being curved, as shown, and a pivoted lever having a cam formed on its inner end, the parts being combined substantially as shown, and adapted to be secured to each other and to the sash-frame by the same screws, for the purpose set forth.

In testimony whereof I affix my signature in presence of two witnesses.

ABEL HASKINS.

Witnesses:
OLIVER A. H. POND,
WM. W. McCLEUCHS.